United States Patent [19]

Forké

[11] Patent Number: 4,936,164
[45] Date of Patent: Jun. 26, 1990

[54] BICYCLE PEDAL-SHOE COUPLER

[76] Inventor: Edward F. Forké, 1545 Marjorie St., Oceanside, Calif. 92056

[21] Appl. No.: 278,972

[22] Filed: Nov. 28, 1988

[51] Int. Cl.⁵ .............................................. G05G 1/14
[52] U.S. Cl. ....................................... 74/594.6; 36/131
[58] Field of Search .................... 74/594.6, 594.4, 560; 36/131; 280/11.3, 11.31, 629, 630

[56] References Cited

U.S. PATENT DOCUMENTS

| | | |
|---|---|---|
| 550,409 | 11/1895 | Hanson . |
| 595,388 | 12/1897 | Hanson .............................. 74/594.6 |
| 598,325 | 2/1898 | McIntyre . |
| 3,930,660 | 1/1976 | Frechin . |
| 3,964,343 | 6/1976 | Lauterbach . |
| 4,290,213 | 9/1981 | Salomon . |
| 4,298,210 | 11/1981 | Lotteau et al. ...................... 74/594.6 |
| 4,314,714 | 2/1982 | Gertsch . |
| 4,377,952 | 3/1983 | Gamondes . |
| 4,488,453 | 12/1984 | Drugeon et al. . |
| 4,640,151 | 2/1987 | Howell . |

FOREIGN PATENT DOCUMENTS

| | | |
|---|---|---|
| 3315282 | 10/1984 | Fed. Rep. of Germany ..... 74/594.6 |
| 3329993 | 3/1985 | Fed. Rep. of Germany ..... 74/594.6 |
| 3426103 | 1/1986 | Fed. Rep. of Germany ..... 74/594.6 |
| 3724578 | 1/1988 | Fed. Rep. of Germany ..... 74/594.6 |
| 2315875 | 1/1977 | France ............................... 74/594.6 |
| 183582 | 10/1980 | Italy .................................. 74/594.6 |

OTHER PUBLICATIONS

Cyclist Magazine, Jun. 1988, p. 55.

Primary Examiner—Gary L. Smith
Assistant Examiner—F. Saether
Attorney, Agent, or Firm—Duane Bowen

[57] ABSTRACT

Upper and lower coupling members are provided to couple a shoe to a bicycle pedal. The lower coupling member has a central, generally circular recess. The upper coupling member has a boss depending from its lower surface to engage in the recess. The upper coupling member is secured by screws to the cyclist's shoe. A pair of lengths of spring wire form part of an M-shaped spring secured in the lower coupling member. The boss has a pair of horizontally extending grooves into which the spring lengths snap to latch the coupling members together. A pair of abutments in the recess coact with a pair of flat sides on the boss to limit heel-in shoe movement to an arc insufficient to unlatch the wire lengths from the grooves. In a heel-out rotary direction, however, the boss can turn in the recess through an arc sufficient for the lengths of spring wire to come out of the grooves so that the coupling members can become disengaged by a lifting force on the shoe.

13 Claims, 2 Drawing Sheets

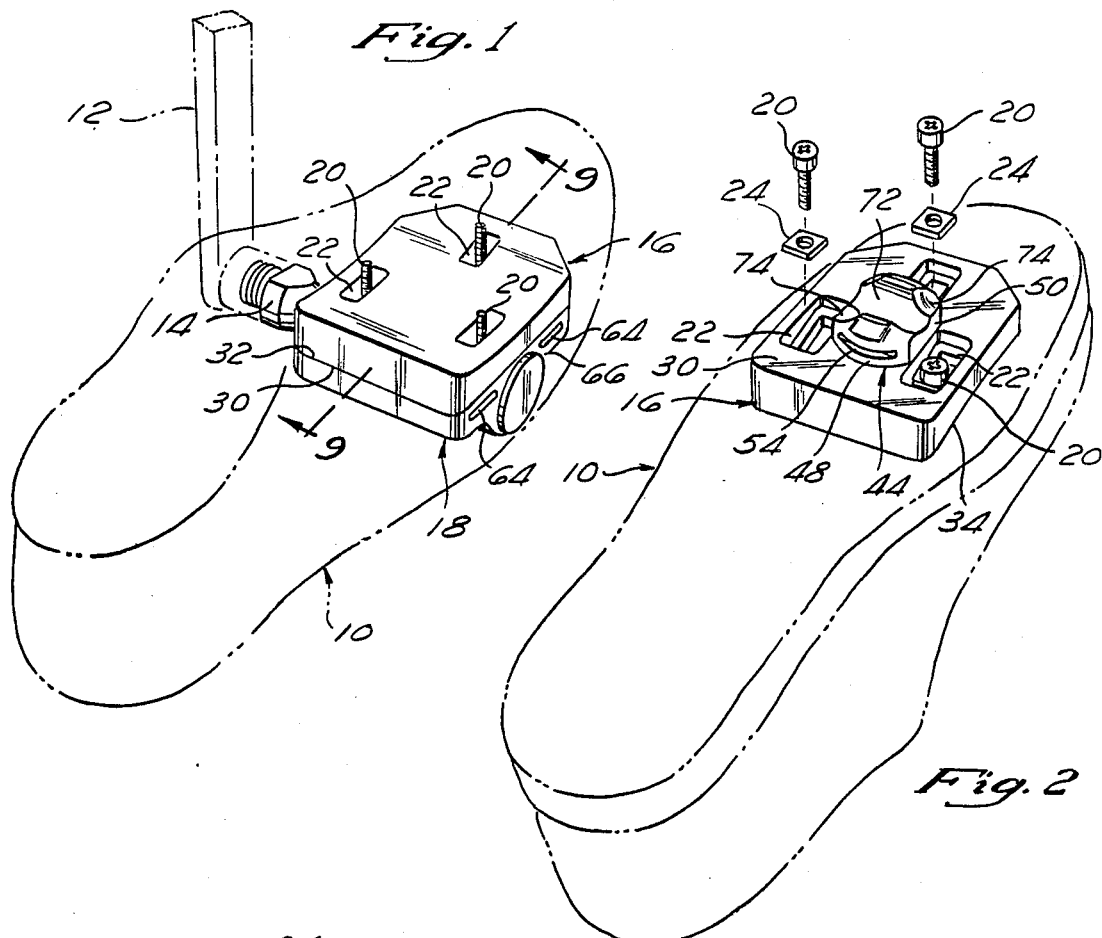
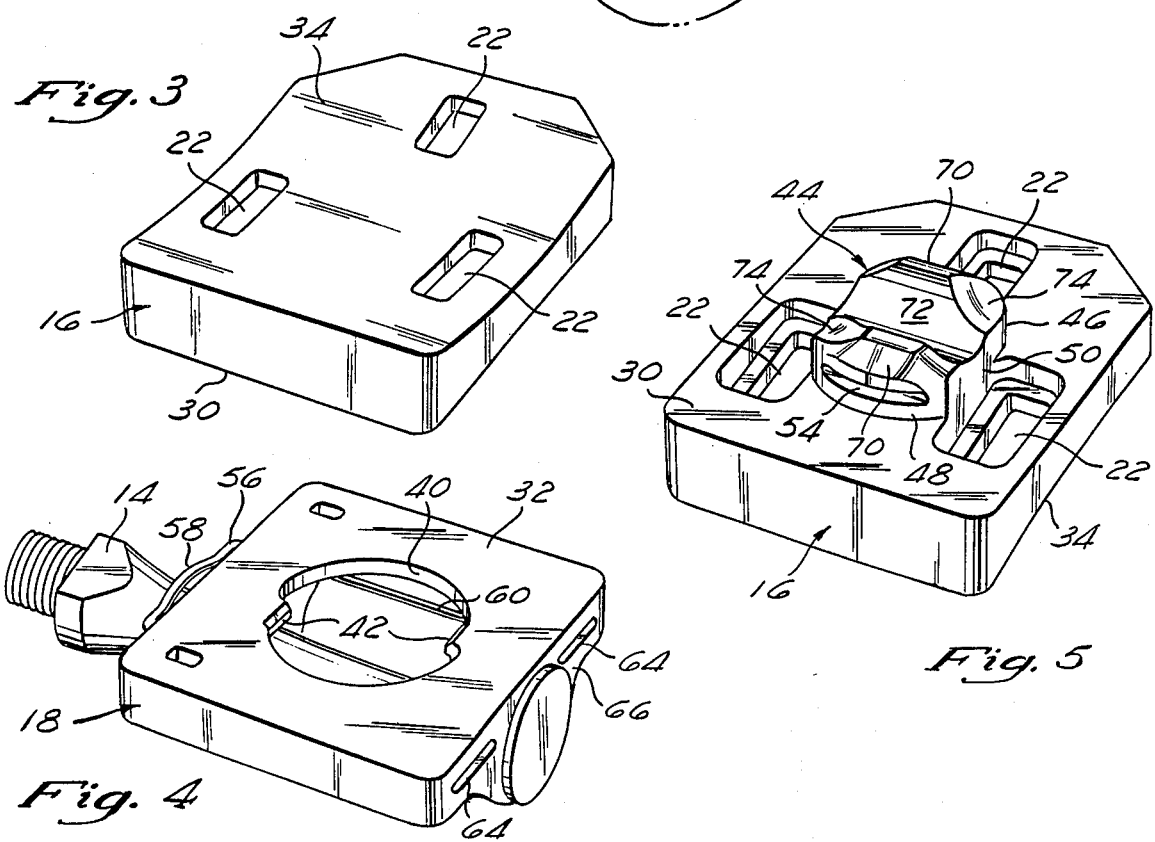

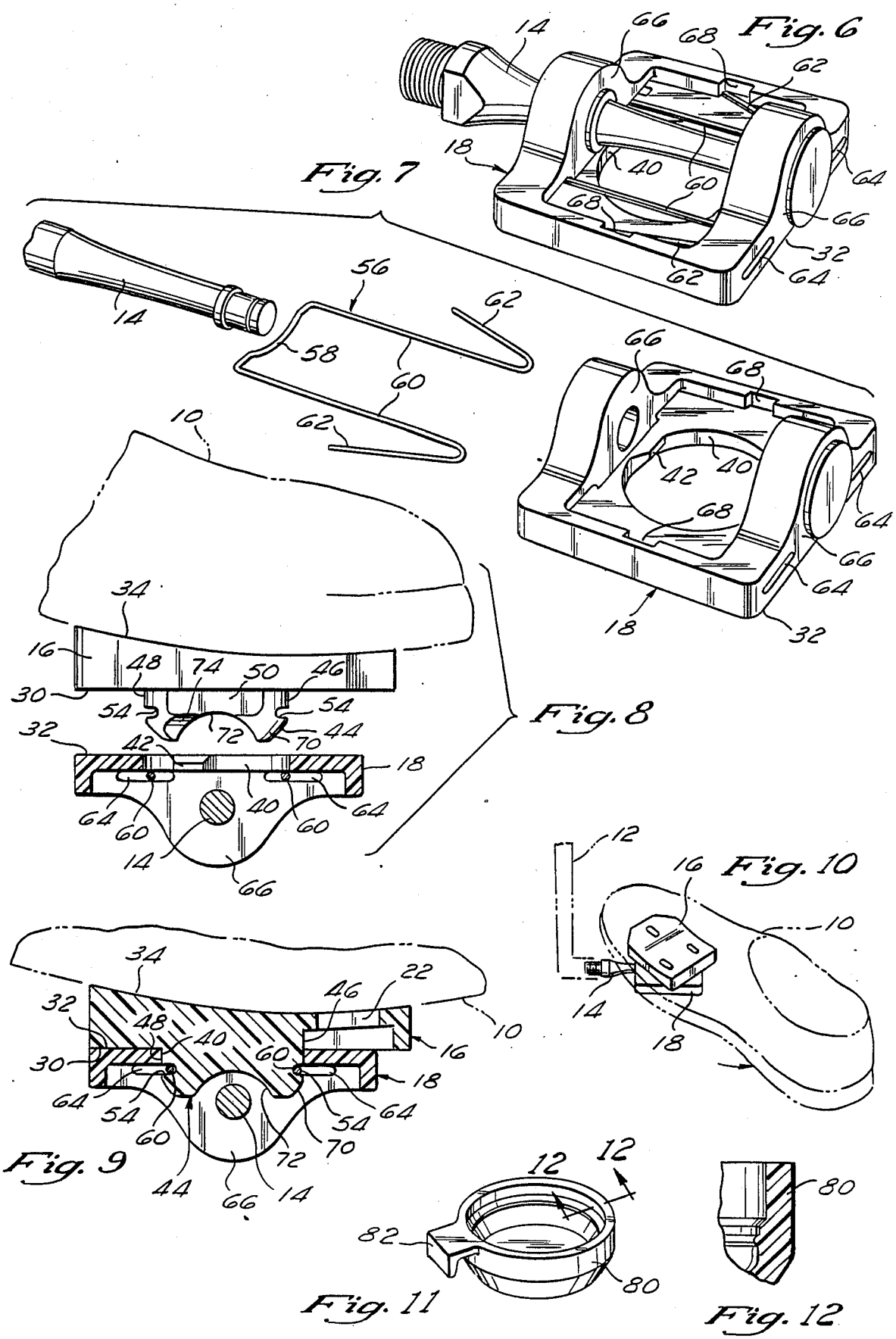

BICYCLE PEDAL-SHOE COUPLER

BRIEF SUMMARY OF THE INVENTION, BACKGROUND AND OBJECTIVES

My invention relates to an improvement in couplings between bicycle pedals and a cyclist's shoe.

The *American Bicyclist & Motorcyclist,* February 1988 issue, page 39, had an item entitled "Shoe-Pedal System Wish List" by John S. Allen, that reads as follows:

"The following is a list of features for a "dream" shoe-pedal system. This system would serve all types of riders—racers and utility riders, on-road and off-road. No system yet offers all of these features; the requirements are so contradictory that no such system may ever exist. Also, some requirements are more important to one type of rider than to another.

Safety-release to prevent injury to rider, with upward or backward pull of foot, inward or outward force at heel or knee.

Secure positioning of shoe on pedal for power transfer.

Light weight.

High cornering clearance.

Low foot height over pedal spindle center, to stabilize the foot while pedaling.

Option to allow rotational freedom of foot while pedaling (helpful with some knee problems).

Easy entry and exit.

Ability to use an ordinary street shoe on the pedals, though with a partial or total sacrifice of locking properties.

No need to tighten toe strap and cut off circulation to toes.

No restriction on bulk of shoe (or shoe cover) which may be used—important in cold weather.

Non-clogging, reliable operation under muddy conditions.

Simplicity of adjustment, use and maintenance.

Low initial cost."

It is an objective of my invention to provide those desirable features in a pedal-shoe coupler insofar as feasible. Of those features listed by Allen, my new pedal-shoe coupler has all of the features except I haven't as yet provided ability to walk comfortably in the shoe having the shoe part of the coupler intact thereon.

It is an objective to provide rotational freedom of the foot while pedaling within normal foot rotation limits and to provide for release of the coupler upon further outward rotational movement at the heel of the foot. It is an objective, however, to be able to couple the shoe to the pedal simply by downward foot pressure without foot rotation needed. Light weight is another primary objective. Other objectives include high reliability, simplicity, low maintenance, low cost, ease of use including coupling and uncoupling. An additional objective is to provide compatability with the so-called "LOOK" points of attachments to the shoe (LOOK USA, Burlington, VT, is the American distributor of the LOOK French-made coupler with three point shoe attachment).

My invention will be best understood, together with additional advantages and objectives thereof, when read with reference to the drawings.

DRAWINGS

FIG. 1 is a perspective view showing my new coupler in full lines and showing a shoe and a pedal and axle in dashed lines.

FIG. 2 is a perspective view of an upper coupling member in full lines and showing in dashed lines a shoe from its underside, to which the coupling member is being attached with screws.

FIG. 3 is a perspective view, taken from above, of an upper coupling member.

FIG. 4 is a perspective view, taken from above, of a lower coupling member attached to a bicycle pedal axle.

FIG. 5 is like FIG. 3 but is taken from below.

FIG. 6 is like FIG. 4 but is taken from below.

FIG. 7 is a view like FIG. 6 but the parts are shown in exploded form.

FIG. 8 is an elevational view, partly in section, showing a portion of a shoe and showing an upper coupling member in position to be engaged in a lower coupling member.

FIG. 9 is generally like FIG. 8 but shows the coupling members coupled together.

FIG. 10 is a perspective view showing a shoe being turned in a direction to unlock the coupling members. Pedal and shoe are shown in dashed lines.

FIG. 11 is a perspective view of a cap to be used on the upper coupling member boss to protect it when uncoupled and being walked upon.

FIG. 12 is a partial sectional view taken on line 12—12 of FIG. 11.

DESCRIPTION

My invention relates to couplers between the shoes of a bicycle rider and the axles of the pedals. In the drawings the right shoe 10 of the cyclist is shown and the crank arm 12 and the axle 14 of the right bicycle pedal are shown. An upper coupling member 16 is attached to shoe 10 and a lower coupling member 18 is attached to axle 14. Members 16, 18 are molded from plastic. Glass-fiber filled Nylon is a suitable material.

I have omitted illustrations of bearings between axle 14 and lower coupling member 18 in most respects because the interposition of bearings between axles and pads can follow prior practices. There are various alternatives as to types of bearings and as to types of securements of the bearings in the pads. The particular bearings or securements used are not pertinent to the novelty of the present invention. Part of the securement may be by press-fitting the bearings into properly sized bores in the plastic molding forming lower coupling member 18.

Upper coupling member 16 is attached to shoe 10 by three countersunk screws 20 fitting into slots 22 in coupling member 16. Washers 24 are used to spread the pressure on the plastic forming member 16. Slots 22 are spaced according to the so-called "LOOK" points of attachment to the shoe (LOOK USA, Burlington, VT., is the American distributor of the LOOK French-made coupler with three point shoe attachment.) This compatability is convenient so that shoes prebored with LOOK points of attachment will fit coupling member 16. To some extent, the LOOK points of attachment are becoming a standard in the industry. The use of slots in the LOOK system, rather than merely round screw openings, permits some shifting of the coupler longitudinally of the shoe for best placement of the foot relative to axle 14.

Coupling members 16, 18 constitute generally horizontally disposed, superposed pads with generally flat abutting surfaces 30, 32, whereas the upper surface 34 of coupling member 16 is somewhat bowed in a concave manner to fit the sole of shoe 10. Surfaces 30, 32 being superposed, flat and abutting, this means that these surfaces are compatible with relative rotation of coupling members 16, 18 about an upright axis. This gives limited rotational freedom of the feet when pedaling, which is helpful to prevent or alleviate some knee problems.

Lower coupling member 18 has a generally central recess 40 extending through the pad portion of the coupling member. Recess 40 is shown to be circular except for the areas of diametrically opposed abutments 42 that extend from the sides of recess 40.

Upper coupling member 16 has a boss 44 depending therefrom and fitting into recess 40. Boss 44 in generally horizontal cross-section has partly circular portions 46, 48 located diametrically oppositely in front and back respectively. Circular portions 46, 48 generally match the curvature of recess 40 so that boss 44 can turn through a limited arc in recess 40 due to the matching circular portions of boss 44 and recess 40. The relative rotation mounting between boss 44 and recess 40 is useful not only in unlatching of the coupler but also, as before indicated, to permit some rotation of the cyclist's shoes during cycling, which is beneficial relative to knee problems.

One or more abutments could be otherwise provided on the couplers, but I have provided the abutment function by abutments 42 protruding inwardly from diametrically opposite points on the sides of recess 40 which coact with flat portions 50 on opposite sides of boss 44 to limit rotation of boss 44 in recess 40.

If FIGS. 4 and 5 are studied, it will be seen that boss 44 can be turned further counterclockwise than clockwise in recess 40 before flat boss portions 50 abut against abutments 42. This limitation is used to insure that the coupling members only unlatch when the feet are pivoted in heel-out directions. The heel-out direction is counterclockwise on the right side of the bicycle. The coupling and pedal parts shown in the drawings are for the right side of the bicycle. FIG. 10 shows this counterclockwise, heel-out rotation of the foot for coupler unlatching.

I will now describe the latching mechanism between coupler members 16, 18. Boss 44 has horizontally extending grooves 54 front and back in the areas of the circular portions of boss 44. Lower coupling member 18 has spring means 56 to latch into grooves 54.

Spring means 56 is shown particularly in FIG. 7 to be formed from a single spring wire of generally M outline including a central web portion 58 joining generally parallel lengths of wire 60. At the other ends of wire lengths 60 are reversely bent legs 62. The free ends of legs 62 are anchored in the pad of coupling member 18. Spring 56 is secured in place by passing the reverse bends through slots 64 in two end walls 66 forming parts of lower coupling member 18. The ends of reversely bent legs 62 are caught in a "no-return" manner by abutments 68.

Straight lengths 60 of spring 56, thus, are supported so that they may be spread apart by force applied by boss 44 until the locations of grooves 54 are reached whereupon spring lengths 60 snap into grooves 54 to latch coupling members 16, 18 together. The lower edges of boss 44 has radiuses or chamfers 70 for the purpose of camming wire lengths 60 apart. Wire lengths 60 will slide in grooves 54 to permit relative rotary movement between coupling members 16, 18.

To unlatch coupling members 16, 18, boss 44 needs to turn until wire lengths 60 pass beyond grooves 54. At that point boss 44 is unlatched and the coupling members 16, 18 can be separated by raising shoe 10 with upper coupling member 16 off of lower coupling member 18. As before indicated, abutments 42 in recess 40 prevent upper coupling member 16 from being rotated far enough clockwise (or in a heel-in rotary direction) to unlatch wire lengths 60 from grooves 54. How soon boss 44 becomes unlatched from recess 40 in rotating in a counterclockwise (heel-out) direction depends on the length and depth of groove 54 among other factors It is preferred that each groove 54 extend to more than ninety degrees of the circumference of boss 44.

Boss 44 has a lateral groove 72 in its lower surface to provide room so that pedal axle 14 won't restrict pivoting of boss 44 in recess 40. Corners 74 also may need to be relieved to provide room for axle 14 in the unlatching counterclockwise rotary direction.

FIGS. 11 and 12 show a resilient rubber or plastic cap 80 adapted to snap over boss 44 when the coupling members 16, 18 are unlatched so that the user can walk in shoe 10 without damaging boss 44 and without filling boss grooves 54 with debris. A lug 82 is provided to facilitate removal of cap 80.

It will be observed that the rider of a bicycle using my couplers can readily uncouple, to prevent falling, by heel-out, lift-up shoe movements. During use, however, the shoes are securely fastened to the pedals. The construction shown, when made primarily of plastic, has minimum bulk and weight. The cornering clearance is much like a traditional bicycle pedal pad. The feet are supported at minimum distances over the longitudinal axes of the axles. The foot has rotational freedom during use of the coupler. Latching and unlatching are easy. The coupling should operate satisfactorily during muddy conditions. The coupling is easy to maintain. The construction is relatively inexpensive.

Having thus described my invention, I do not wish to be understood as limiting myself to the exact construction shown and described. Instead, I wish to cover those modifications of my invention that will occur to those skilled in the art upon learning of my invention and which are within the proper scope thereof.

I claim:

1. A coupling between a bicycle pedal axle and a cyclist's shoe, comprising:
    (a) a first coupling member attached to said bicycle pedal axle and a second coupling member attached to said cyclist's shoe, said second coupling member being superposed to said first coupling member,
    (b) said first coupling member having a generally horizontally disposed pad and a generally central recess, said recess having partly circular portions located oppositely in front and back in horizontal plan view,
    (c) said second coupling member having a boss depending therefrom and fitting into said recess, said boss having partly circular portions located oppositely in front and back in horizontal bottom view so that said boss can turn through a limited arc due to the circular portions of said recess and said boss, said portions of said boss between said circular portions thereof on opposite sides being noncircular, (d) said boss having horizontally extending grooves front and back in the areas of said circular portions thereof and said first coupling member having spring means including horizontally extending lengths of spring wire in front and back of said recess in the areas of said circular portions of said recess, said lengths of spring wire being spring pressed toward each other and into said grooves to latch said coupling members together when said shoe is in normal disposition relative to said pedal axle, said spring wires becoming unlatched from said grooves when the cyclist's foot rotates said cyclist's shoe sufficiently out of normal disposition relative to said pedal axle whereby said coupling members can be separated, and (e) said first coupling member having an abutment on at least one side of said recess limiting rotation of said shoe relative to said pedal axle in a heel-in rotary direction so that said lengths of spring wires only unlatch from said grooves when said shoe is rotated relative to said pedal axle in a heel-out rotary direction.

2. The coupling of claim 1 in which said boss has a lateral groove in its lower surface to provide room so that said pedal axle won't restrict pivoting of said boss in said recess.

3. The coupling of claim 1 in which said spring means is formed by a single wire of generally M outline including a central web portion joining said lengths of spring wire at one end of said lengths and including reversely bent legs at the other ends of said lengths of spring wire, said legs having their free ends anchored in said pad whereby spreading apart of said lengths of spring wire is resisted by said central web portion joining said lengths and by said reversely bent legs.

4. The coupling of claim 1 in which the lower edges of said boss have radiuses to facilitate ease of insertion of said boss into said recess.

5. The coupling of claim 1 in which each groove extends no more than ninety degrees of the circumference of said boss.

6. A coupling between a bicycle pedal axle and a cyclist's shoe, comprising:

(a) a first coupling member attached to said bicycle pedal axle and a second coupling member attached to said cyclist's shoe, said second coupling member being superposed to said first coupling member, (b) said first coupling member having a generally horizontally disposed pad and a generally central recess, said recess having Partly circular portions located oppositely in front and back in horizontal plan view, (c) said second coupling member having a boss depending therefrom and fitting into said recess, said boss having partly circular portions located oppositely in front and back in horizontal bottom view so that said boss can turn through a limited arc due to the circular portions of said recess and said boss, and (d) said boss having horizontally extending grooves front and back in the areas of said circular portions thereof and said first coupling member having spring means including horizontally extending lengths of spring wire in front and back of said recess in the areas of said circular portions of said recess, said lengths of spring wire being spring pressed toward each other and into said grooves to latch said coupling members together when said shoe is in normal disposition relative to said pedal axle, said spring wires becoming unlatched from said grooves when the cyclist's foot rotates said cyclist's shoe sufficiently out of normal disposition relative to said pedal axle whereby said coupling members can be separated.

7. A coupling between a bicycle pedal axle and a cyclist's shoe, comprising:

(a) a first coupling member attached to said bicycle pedal axle and a second coupling member attached to said cyclist's shoe, said second coupling member being superposed to said first coupling member, (b) said first coupling member having a generally horizontally disposed pad and a generally central recess, said recess having partly circular portions located oppositely in horizontal plan view, (c) said second coupling member having a boss depending therefrom and fitting into said recess, said boss having partly circular portions located oppositely in horizontal bottom view so that said boss can turn through a limited arc due to the circular portions of said recess and said boss, and (d) said boss having horizontally extending grooves in the areas of said circular portions thereof and said first coupling member having spring means including horizontally extending lengths of spring wire in the areas of said circular portions of said recess, said lengths of spring wire being spring pressed toward each other and into said grooves to latch said coupling members together when said shoe is in normal disposition relative to said pedal axle, said spring wires becoming unlatched from said grooves when the cyclist's foot rotates said cyclist's shoe sufficiently out of normal disposition relative to said pedal axle whereby said coupling members can be separated.

8. The coupling of claim 7 in which said coupling members have abutment means limiting rotation of said shoe relative to said pedal axle in a heel-in rotary direction so that said lengths of spring wires only unlatch from said grooves when said shoe is rotated relative to said pedal axle in a heel-out rotary direction.

9. The coupling of claim 7 in which abutment means are provided by a pair of diametrically opposed protrusions from opposite walls of said recess and by having flat portions on the sides of said boss which abut against said protrusions to prevent unlatching in a heel-out rotary direction.

10. A coupling between a bicycle pedal axle and a cyclist's shoe, comprising:

(a) a first and a second coupling member, one attached to said bicycle pedal axle and the other attached to said cyclist's shoe, said coupling members being superposed, (b) said first coupling member having a generally horizontally disposed pad and a generally central recess, said recess having circular portions located oppositely in horizontal plan view, (c) said second coupling member having a boss extending therefrom and fitting into said recess, said boss having recess-engaging portions located oppositely in horizontal bottom view so that said boss can turn through a limited arc due to the circular portions of said recess and said recess-engaging portions of said boss, and (d) said first and second coupling members having spring-pressed interengaging means latching said coupling members together when said shoe is in normal disposition relative to said pedal axle, said interengaging means becoming unlatched when the cyclist's foot rotates said cyclist's shoe sufficiently out of normal disposition relative to said pedal axle whereby said coupling members can be separated.

11. The coupling of claim 10 in which said coupling members have abutment means limiting rotation of said shoe relative to said pedal axle in a heel-in rotary direction so that said interengaging means only unlatch when said shoe is rotated relative to said pedal axle in a heel-out rotary direction.

12. A coupling between a bicycle pedal axle and a cyclist's shoe, comprising:
    (a) a first and a second coupling member, one attached to said bicycle pedal axle and the other attached to said cyclist's shoe,
    (b) said first coupling member having a generally horizontally disposed pad and a generally central recess, said recess being at least partly circular in horizontal cross-section,
    (c) said second coupling member having a boss extending toward said first coupling member and fitting into said recess and being at least partly circular in horizontal cross-section so that said boss can turn in said recess when said shoe turns relative to said pedal axle, and
    (d) one of said coupling members having at opposite sides relative to said boss and said recess spring-pressed latching members and the other of said coupling members having latch-receiving members on opposite sides so that said latching members fit into said latch-receiving members and latch said coupling members together when said shoe is in normal disposition relative to said pedal axle, said latch-receiving members extending only partway relative to the circumferences of said boss and said recess so that said latching members become unlatched from said latch-receiving members when said shoe is twisted sufficiently out of normal disposition relative to said pedal axle whereby said coupling members can be separated.

13. The coupling of claim 12 in which said coupling members have abutment means limiting rotation of said shoe relative to said pedal axle in a heel-in rotary direction so that said latching members only unlatch from said latch-receiving members when said shoe is rotated relative to said pedal axle in a heel-out rotary direction.

* * * * *